Mar. 13, 1923.
J. F. HENDERSON
1,448,662
BURNING IN MACHINE
Filed Apr. 5, 1921
3 sheets-sheet 2
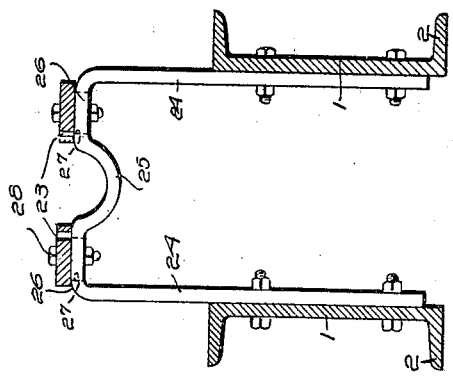
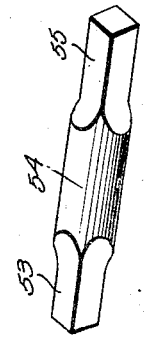
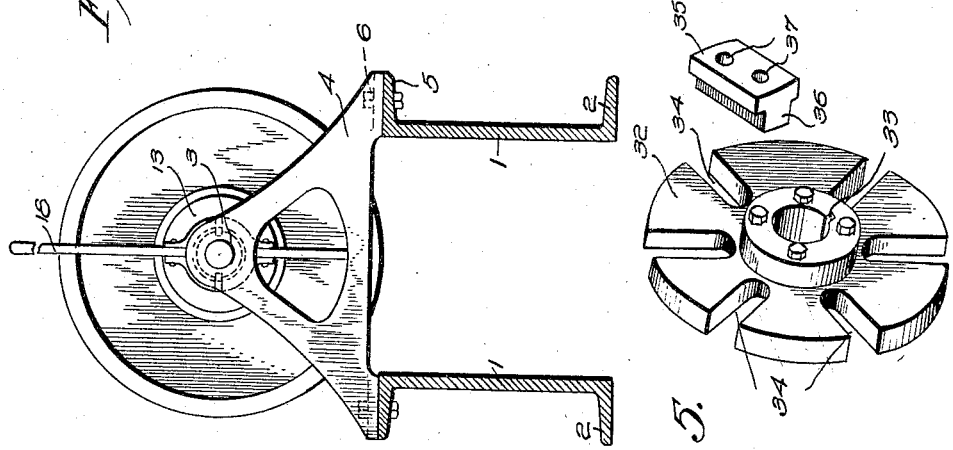
Inventor
J. F. HENDERSON
By
C. H. Parker, Attorney Mar. 13, 1923.
J. F. HENDERSON
BURNING IN MACHINE
Filed Apr. 5, 1921
1,448,662
3 sheets-sheet 3
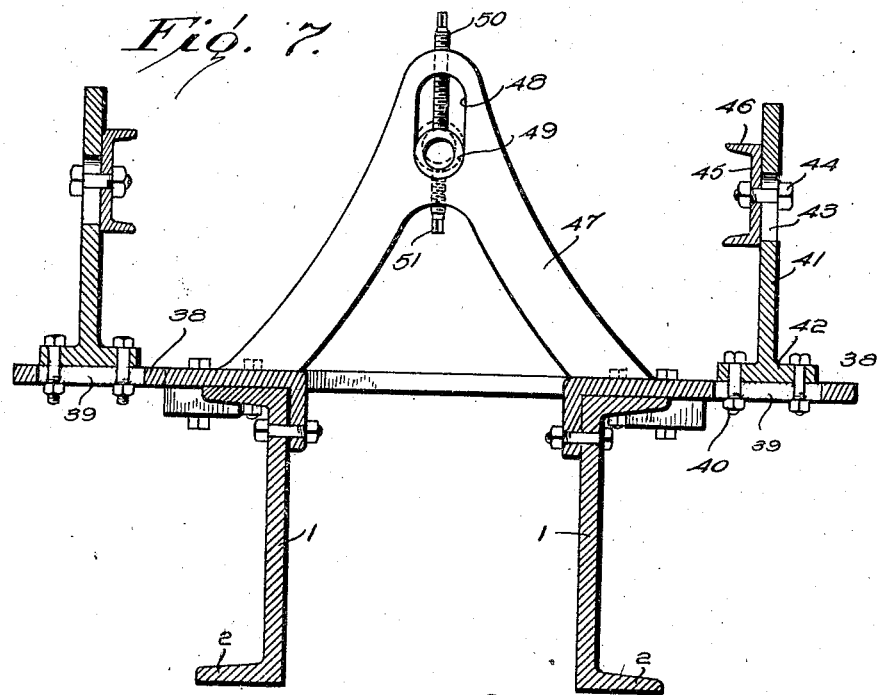
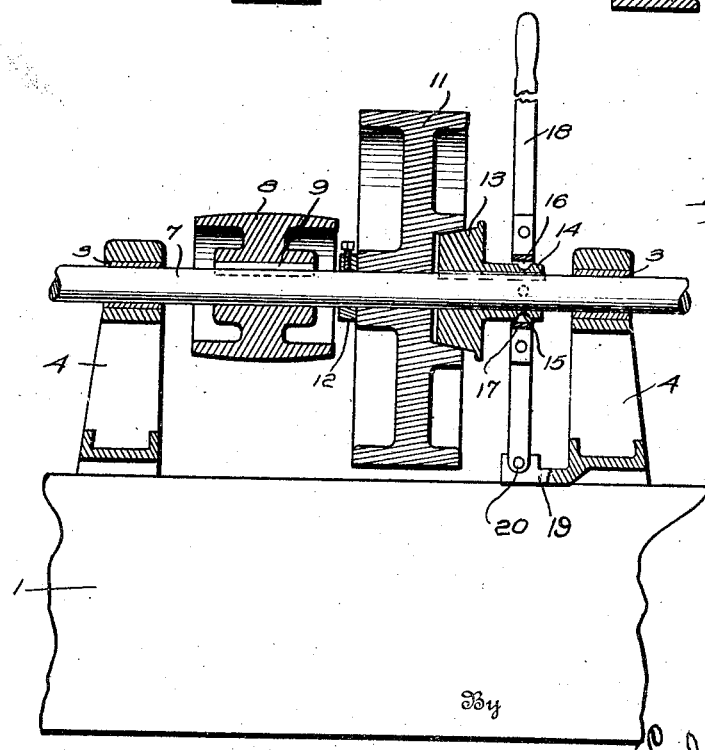
Inventor
J. F. HENDERSON Patented Mar. 13, 1923.

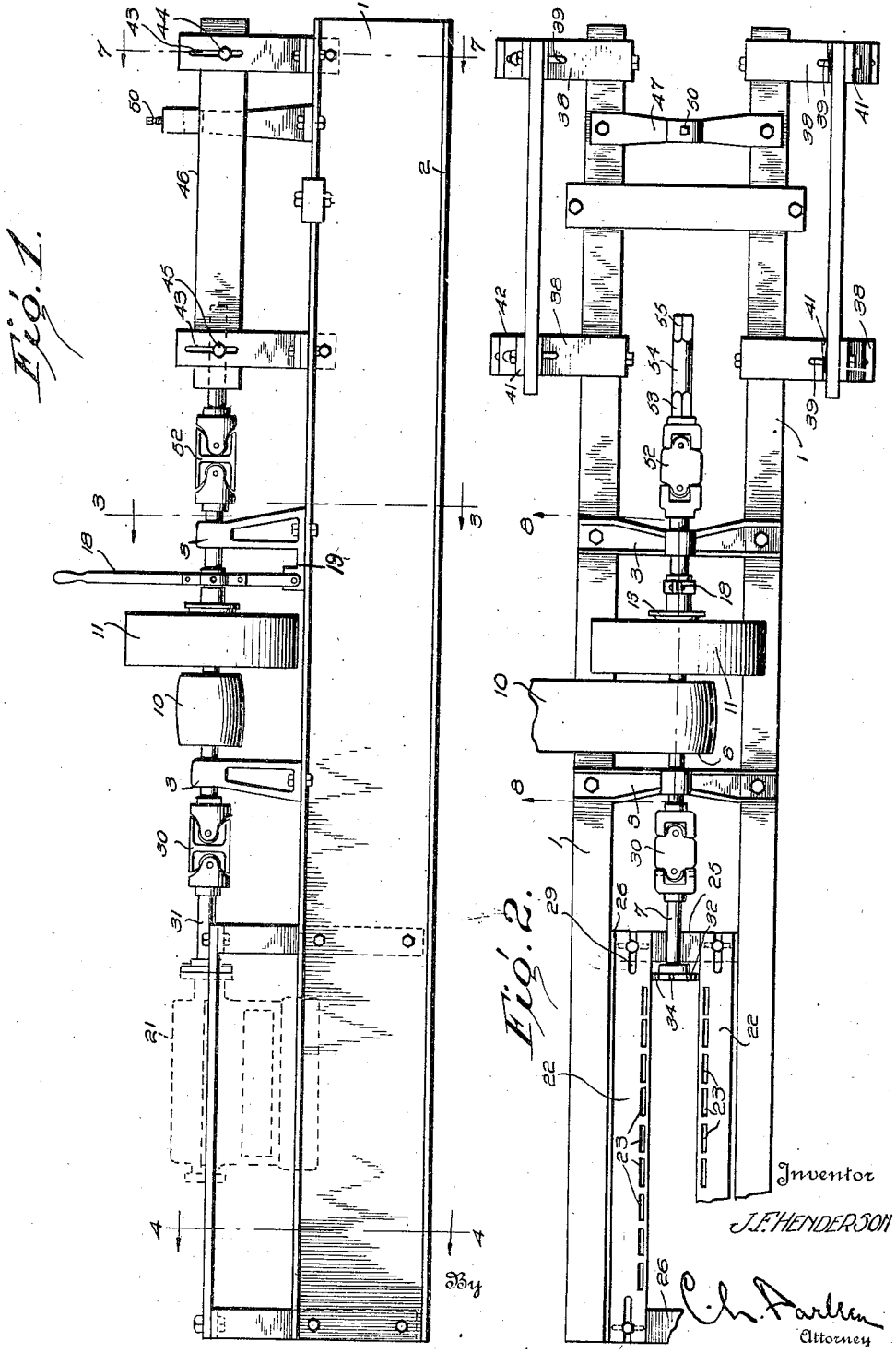

1,448,662

UNITED STATES PATENT OFFICE.

JOHN FRASIER HENDERSON, OF ADA, OKLAHOMA.

BURNING-IN MACHINE.

Application filed April 5, 1921. Serial No. 458,829.

*To all whom it may concern:*

Be it known that I, JOHN F. HENDERSON, a citizen of the United States, residing at Ada, in the county of Pontotoc and State of Oklahoma, have invented certain new and useful Improvements in Burning-In Machines, of which the following is a specification.

This invention relates to burning-in machines, and it comprises a frame, bearings mounted on said frame, a shaft arranged in said bearings, a fly-wheel loosely mounted on said shaft, and an adjustable engine support arranged on each end of the frame.
In the present invention, I have provided a machine for burning-in bearings and testing motors. The machine comprises a suitable support or frame, and a driven shaft arranged in bearings mounted on the frame.
Adjacent one end of the shaft, there is provided means for supporting a motor where the sides of the motor may be engaged, and at the other end, there is provided a three-point suspension device for supporting motors of this type. When the bearings have been arranged in the engine, the shaft is connected to the main crank shaft of the engine, and the engine revolved to burn-in the bearings in the usual manner.
The device may also be employed for testing motors under their own power before being placed in the chassis, and for this purpose, I provide a heavy fly-wheel, loosely mounted on the shaft, and a clutch for connecting the fly wheel to the shaft to provide a balance wheel for the engine, and when the engine is being tested under its own power.

The various parts of the engine or motor supports are made adjustable to permit them to be adjusted to support motors of various sizes.

In the accompanying drawings, I have shown one embodiment of the invention. In this showing:

Figure 1 is a side elevation,
Figure 2 is a top plan view,
Figure 3 is a transverse vertical sectional view on line 3—3 of Figure 1, Figure 4 is a similar view on line 4—4 of Figure 1,
Figure 5 is a detail perspective view of means for connecting the crank shaft of a motor or engine to the main shaft of the testing apparatus,
Figure 6 is a similar view of another means employed with another type of engine, Figure 7 is a sectional view on line 7—7 of Figure 1, and, Figure 8 is a longitudinal sectional view on line 8—8 of Figure 3.

Referring to the drawings, the reference numeral 1 designates a pair of beams forming the frame or main support. These beams may be made of any suitable material, and of any suitable shape. As shown, channel beams are employed having base flanges 2, whereby the device may be secured to a floor or other foundation. Arranged substantially centrally of the frame, there is provided a pair of bearings 3, supported on suitable brackets 4, secured to the upper flange 5 of the beams 1, as at 6. A main shaft 7 is supported on these bearings, and this shaft is provided with a pulley 8, which is keyed thereto, as at 9, and provided with a belt or other driving means 10, by which the engine may be started when being tested. A pulley 11 of appreciable weight is loosely mounted on the shaft and is prevented from longitudinal movement by a collar 12. This pulley is provided with a recess, substantially frustro-conical in shape, for the reception of a cone clutch 13, which is keyed to the shaft, and is provided with an outwardly extending hub 14, having a groove 15, for the reception of pins or projections, 16, carried by a ring 17. The ring is secured to a handle 18, which is pivotally mounted in a bracket 19, secured to one of the bearing brackets, as at 20. A belt or other suitable drive means (not shown) may be arranged in engagement with the pulley to drive the machine when being used for burning-in bearings.

At one end of the machine, there is provided means for supporting a motor which has a pair of flanges extending along the top of the crank case section longitudinally of the motor. The motor is represented in dotted lines in Figure 1 of the drawings, at 21, being shown in an inverted position and resting on a pair of plates 22. These plates are provided with a plurality of spaced slots 23, for the reception of bolts passing through the bolt holes in the flange of the crank case. As shown, the plates are supported on a pair of substantially U-shaped members 24, which are secured to the beams 1, and are provided with substantially semi-circular recesses for the reception of the end of the crank case of the motor. As shown, the horizontal portions 26 of the U-shaped members 24 are provided with slots 27, and bolts or other fastening means 28 are arranged in these slots and passed through openings in the plates 22 to permit transverse adjustment of the plates. The ends of the plates 22 are also provided with longitudinal slots 29 to permit them to be adjusted longitudinally of the frame of the machine. A universal joint 30 of any suitable type is arranged adjacent the end of the shaft 7, as shown. The section 31 extending beyond the universal joint is provided with a flanged disc 32 (see Figure 5), which may be keyed thereto, as at 33, and which is provided with a plurality of radial slots 34. Blocks 35 having longitudinal tongues or ribs 36 are adapted to be secured in these slots, and these blocks are provided with openings 37 for the reception of bolts or other fastening means, passing through the end of the crank shaft.

The opposite end of the frame is provided with means for supporting a three-point suspension motor. As shown, a pair of angle irons 38 are arranged on opposite sides of the frame, and these angle irons are provided with slots 39 for the reception of bolts or other fastening means 40, whereby a vertical supporting member 41 is adjustably supported on the angle iron to permit transverse adjustment thereof. As shown, the vertical member is substantially T-shaped, and is provided with a flange 42, through which the bolts 40 are arranged. These vertical members are provided with slots 43, for the reception of bolts 44, passing through channel irons 45. The upper flange 46 of the channel iron is adapted to engage a lug arranged on each side of the motor or engine casing to support it. The pair of channel irons arranged on opposite sides of the frame engage two lugs at one end of the motor and support it. The machine is further provided with a bracket 47 having an elongated opening 48 in which a sleeve 49 is adjustably supported. This sleeve may be raised and lowered by means of threaded rods 50 and 51, to properly adjust the other end of the motor. A knuckle joint 52 is arranged adjacent this end of the shaft, and the outer side of the knuckle joint is provided with a squared opening for the reception of a squared end 53 of a connecting shaft 54. This shaft is provided with a second squared end 55, which is adapted to be received in the squared opening in a motor transmission or knuckle joint.

It will be apparent that any type of motor may be supported on the machine and connected to the shaft 7 to drive the motor or engine for burning-in bearings. When the bearings have been burned in, and before the engine is placed in the chassis, it may be tested under its own power by connecting it to a suitable source of current to supply the ignition current and operating the engine. When the burning-in machine is started, the clutch 13 is brought into engagement with the pulley 11, to cause the pulley to revolve the shaft. The engine may be started when it is to be tested by means of pulley 8 and the pulley 11 employed as a fly-wheel.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A burning-in machine comprising a frame, bearings mounted thereon, a shaft mounted in said bearings, a pair of substantially U-shaped members secured to the frame beyond the end of the shaft, a pair of horizontally arranged plates arranged on said U-shaped members, said U-shaped members being provided with transverse slots for the reception of fastening means to permit adjustment of said plates, said plates being provided with a plurality of slots for the reception of bolts carried by a part of an engine, and means for securing the end of said shaft to the crank shaft of an engine supported on said plates.

2. A burning-in machine comprising a frame, bearings mounted thereon, a shaft mounted in said bearings, an adjustable engine support arranged adjacent one end of said shaft, said support comprising a pair of horizontally disposed plates adapted to engage suitable parts of the side of an engine, and an engine support arranged adjacent the other end of the shaft, said support comprising a pair of plates adjustable vertically and longitudinally and adapted to receive and support lugs formed on the side of an engine, and a vertically adjustable central support adapted to engage a lug on the end of an engine.

3. A burning-in machine comprising a frame, bearings mounted thereon, a shaft mounted in said bearings, a pair of substantially U-shaped members secured to the frame beyond the end of the shaft, said U-shaped members being provided with transverse slots, a pair of horizontally arranged plates having their ends arranged on said U-shaped members, said plates being provided in their ends with longitudinal slots adapted to receive fastening means passing through the slots in said U-shaped members, said plates being provided near their inner edges with a plurality of slots for the reception of bolts carried by a part of an engine, and means for securing the end of said shaft to the crank shaft of an engine supported on said plates.

4. A burning-in machine comprising a frame, bearings mounted thereon, a shaft mounted in said bearings, an adjustable engine support arranged adjacent one end of said shaft, said support comprising a pair of horizontally disposed plates adapted to engage suitable parts of the sides of an engine, an engine support arranged adjacent the other end of the shaft, said support comprising a pair of plates adjustable vertically and longitudinally, and adapted to receive and support lugs formed on the sides of an engine, a central support carried by said frame and provided with a vertical slot, said slot being adapted to receive a sleeve adapted to engage a lug on the end of an engine, and means for vertically adjusting the sleeve in the slot.

In testimony whereof I affix my signature in presence of two witnesses.

JOHN FRASIER HENDERSON.

Witnesses:
   TOM D. MCKEOWA,
   ALBERT S. ROSS.